Patented Apr. 9, 1940

2,196,295

UNITED STATES PATENT OFFICE 2,196,295

OBTAINMENT OF ESTROGENIC SUBSTANCES

Carl W. Eberlein, Highland Park, N. J., assignor to E. R. Squibb & Sons, New York, N. Y., a corporation of New York No Drawing. Application April 15, 1938,
Serial No. 202,229

6 Claims. (Cl. 167—74)

This invention relates to the obtainment of estrogenic substances from pregnancy urine and other body-fluid sources, and has for its object the provision of an extraction process in which both the yield and the purity of the extracted estrogenic substances are improved.

Essentially, the process of this invention comprises digesting a body-fluid source of estrogenic substances with a proteolytic enzyme, extracting the estrogenic substance with a solvent therefor, removing the solvent, and purifying the extracted estrogenic substance.

More particularly, the pH of the body-fluid source (e. g., fetal fluid, or the urine of stallions, pregnant mares, or pregnant women) is adjusted to the optimum for the specific proteolytic enzyme to be used, the enzyme is added, and the mixture digested until all of the complex components of the fluid have been broken down; then the pH is adjusted to about 1.0 by adding a mineral acid, preferably hydrochloric acid, and the mixture is boiled for a short time, cooled quickly, and emulsified with an organic water-immiscible solvent for estrogenic substances, preferably ethylene dichloride; the resulting extract is then separated, the solvent removed by evaporation, and the estrogenic substance purified in the conventional manner.

The following examples are illustrative of the invention:

Example 1

500 gallons of pregnant mares' urine is adjusted by means of hydrochloric acid to pH 2.5, and 300 grams of pepsin is added, the material is stirred, slowly raised to a temperature of 38–40° C., and maintained at this temperature with occasional stirring for a period of 24 hours; additional hydrochloric acid is then added to bring the pH down to 1.0, the mixture is brought to a boil with constant stirring for a half hour, and cooled in not more than 2 hours; then 1000 gallons of ethylene dichloride is added, and the mixture is emulsified by stirring vigorously; on standing, two layers form; the lower, ethylene dichloride, layer, containing the desired hormone in solution, is drawn off, and the ethylene dichloride evaporated therefrom, leaving the estrogenic substance in a state suitable for purification by any of the known methods.

Example 2

500 gallons of stallions' urine is adjusted to pH 8.5 by means of caustic soda, and 300 grams of trypsin is added; the mixture is heated with constant stirring to a temperature of 38–40° C. and maintained at this temperature with occasional stirring for a period of 24 hours; then hydrochloric acid is added to adjust the acidity to pH 1.0, the mixture is boiled with continual stirring for a half hour, and cooled in no more than 2 hours; 1000 gallons of ethylene dichloride is added, the mixture stirred to produce an emulsion, and allowed to stand and settle until two distinct layers are produced, the estrogenic substances being contained in the lower, ethylene dichloride, layer, which is separated, and concentrated by evaporation of the ethylene dichloride, leaving the hormone in a condition in which it is easily purified by any of the known methods.

The invention may be variously otherwise embodied within the scope of the appended claims.

I claim:

1. The process for obtaining estrogenic substances from body-fluid sources thereof of the group consisting of fetal fluid, and the urine of stallions, pregnant mares, and pregnant women, which comprises digesting the source material with a proteolytic enzyme, and extracting the estrogenic substance from the digested material with an organic water-immiscible solvent for the estrogenic substance.

2. The process for obtaining estrogenic substances from body-fluid sources thereof of the group consisting of fetal fluid, and the urine of stallions, pregnant mares, and pregnant women, which comprises digesting the source material with a proteolytic enzyme, and extracting the estrogenic substance from the digested material with ethylene dichloride.

3. The process for obtaining estrogenic substances from body-fluid sources thereof of the group consisting of fetal fluid, and the urine of stallions, pregnant mares, and pregnant women, which comprises digesting the source material with a proteolytic enzyme at about 38–40° C., and extracting the estrogenic substance from the digested material with an organic water-immiscible solvent for the estrogenic substance.

4. The process for obtaining estrogenic substances from body-fluid sources thereof of the group consisting of fetal fluid, and the urine of stallions, pregnant mares, and pregnant women, which comprises digesting the source material with a proteolytic enzyme, adjusting the pH to about 1.0, boiling, cooling, and extracting the estrogenic substance from the digested material with an organic water-immiscible solvent for the estrogenic substance.

5. The process for obtaining estrogenic substances from body-fluid sources thereof of the group consisting of fetal fluid, and the urine of stallions, pregnant mares, and pregnant women, which comprises adjusting the pH of the source material to about 8.5, digesting the source material with trypsin, and extracting the estrogenic substance from the digested material with an organic water-immiscible solvent for the estrogenic substance.

6. The process for obtaining estrogenic substances from body-fluid sources thereof of the group consisting of fetal fluid, and the urine of stallions, pregnant mares, and pregnant women, which comprises adjusting the pH of the source material to about 2.5, digesting the source material with pepsin, and extracting the estrogenic substance from the digested material with an organic water-immiscible solvent for the estrogenic substance.

CARL W. EBERLEIN.